(12) United States Patent
Lin

(10) Patent No.: US 9,784,406 B1
(45) Date of Patent: Oct. 10, 2017

(54) PIVOTAL DEVICE FOR A SUPPORT OF AN ELECTRIC DEVICE

(71) Applicant: Leohab Enterprise Co., Ltd., Taichung (TW)

(72) Inventor: Chao-Chi Lin, Taichung (TW)

(73) Assignee: Leohab Enterprise Co., Ltd., Taichung (TW)

( * ) Notice: Subject to any disclaimer, the term of this patent is extended or adjusted under 35 U.S.C. 154(b) by 0 days.

(21) Appl. No.: 15/361,182

(22) Filed: Nov. 25, 2016

(51) Int. Cl.
| | |
|---|---|
| *F16M 11/10* | (2006.01) |
| *F16M 11/04* | (2006.01) |
| *F16M 13/00* | (2006.01) |
| *A47F 5/02* | (2006.01) |
| *A47B 23/04* | (2006.01) |
| *G06F 1/16* | (2006.01) |

(52) U.S. Cl.
CPC ............ *F16M 13/00* (2013.01); *A47B 23/04* (2013.01); *F16M 11/04* (2013.01); *F16M 11/10* (2013.01); *G06F 1/1601* (2013.01); *G06F 1/1681* (2013.01)

(58) Field of Classification Search
CPC ........ F16M 13/00; F16M 11/00; A47B 23/04; G06F 1/1681
USPC ........ 248/447, 371, 346.06, 349.1, 919, 133
See application file for complete search history.

(56) References Cited

U.S. PATENT DOCUMENTS

| | | | | |
|---|---|---|---|---|
| 6,227,518 | B1 * | 5/2001 | Sun | F16M 11/10 248/371 |
| 6,351,535 | B1 * | 2/2002 | Nogas | H04M 1/12 379/435 |
| 7,466,820 | B2 * | 12/2008 | Lee | F16M 11/10 248/919 |
| 8,708,298 | B2 * | 4/2014 | Hu | F16M 11/041 248/371 |
| 9,341,305 | B2 * | 5/2016 | Yeh | F16M 11/38 |
| 9,404,298 | B1 * | 8/2016 | Chen | G06F 1/1681 |
| 9,518,414 | B1 * | 12/2016 | Chen | G06F 1/1681 |

* cited by examiner

*Primary Examiner* — Tan Le
(74) *Attorney, Agent, or Firm* — Muncy, Geissler, Olds & Lowe, P.C.

(57) ABSTRACT

A pivotal device for a support of an electric device includes a base and a flip module. The base includes a compartment. At least one first track is disposed in the compartment and is arcuate. A pressing member is connected to the base via an adjusting member. The adjusting member is coupled to and movable relative to the base. The pressing member and the adjusting member are jointly movable toward to or away from the base. The flip module is received in the compartment and is movable relative to the base along a contour of the at least one first track. The flip module is located between the base and the pressing member. The pressing member abuts a side of the flip module opposite to the base.

7 Claims, 6 Drawing Sheets

PIVOTAL DEVICE FOR A SUPPORT OF AN ELECTRIC DEVICE

BACKGROUND OF THE INVENTION

The present invention relates to a pivotal device and, more particularly, to a pivotal device for a support of an electric device.

Due to flourishing development of the electronic industry, more and more users are familiar with electronic devices, such as tablet computers, for entertainment or business. During use, a user generally holds left and right sides of an electronic device of this type with two hands which are apt to feel tired. More tablet computers have increased screen sizes for seeing films and are, thus, heavier, further aggravating the tiredness of the hands or even causing pain. Although some of the electronic devices can be placed flat on the lap of the user or on a table, it is inconvenient for the user in watching the screen and in operation.

Thus, a need exists for a novel pivotal device for a support of an electric device to mitigate and/or obviate the above disadvantages.

BRIEF SUMMARY OF THE INVENTION

A pivotal device for a support of an electric device according to the present invention includes a base and a flip module. The base includes a compartment. At least one first track is disposed in the compartment and is arcuate. A pressing member is connected to the base via an adjusting member. The adjusting member is coupled to and movable relative to the base. The pressing member and the adjusting member are jointly movable toward to or away from the base. The flip module is received in the compartment and is movable relative to the base along a contour of the at least one first track. The flip module is located between the base and the pressing member. The pressing member abuts a side of the flip module opposite to the base.

In an example, the at least one first track includes two first tracks respectively located on two opposite sides of the compartment, and the flip module includes two first sliding members respectively aligned with the two first tracks.

In an example, the flip module further includes a second sliding member and a third sliding member. Each of the two first sliding members is disposed in one of the two first tracks and is movable relative to the base along a contour of the one of the two first tracks. Each of the two sliding members includes a first side having a first sliding lip and a second side having a second sliding lip. The first sliding lip of each of the two first sliding member is disposed in one of the two first tracks. The first and second sliding lips are arcuate. The second sliding member includes two second tracks respectively on two opposite sides thereof. A third track is disposed between the two opposite sides of the second sliding member. The two second sliding lips of the two first sliding members are respectively and slideably received in the two second tracks. The two second tracks and the third track are arcuate. The third sliding member is coupled to the second sliding member and is movable relative to the second sliding member along a contour of the third track. The third sliding member includes a first end having a sliding portion and a second end having a connecting portion opposite to the sliding portion. The sliding portion of the third sliding member is disposed in the third track. The connecting portion extends beyond the compartment.

In this example, the second sliding member further includes a carrier portion adjacent to an end of the third track. A supporting seat is connected to the carrier portion of the second sliding member. An elastic member is mounted to the supporting seat. The supporting seat includes a peg on a side thereof adjacent to the carrier portion. The elastic member has a first tang pressing against the carrier portion of the second sliding member and a second tang abutting the stopper portion for pressing against the second sliding member. The elastic member further includes an intermediate portion between the first and second tangs and mounted around the peg.

In an example, the elastic member is a torsion spring.

In an example, the adjusting member is connected to the base by screwing.

In an example, the at least one track includes a limiting portion on a side thereof adjacent to the compartment. The first sliding member includes a limiting protrusion. When the flip module is extended, the limiting protrusion abuts the limiting portion.

In an example, an elastic element is mounted between the pressing member and the base and includes a first end abutting the pressing member and a second end abutting the base.

In an example, the pressing member abuts the second sliding member.

The present invention will become clearer in light of the following detailed description of illustrative embodiments of this invention described in connection with the drawings.

DETAILED DESCRIPTION OF THE INVENTION

Figure 1:
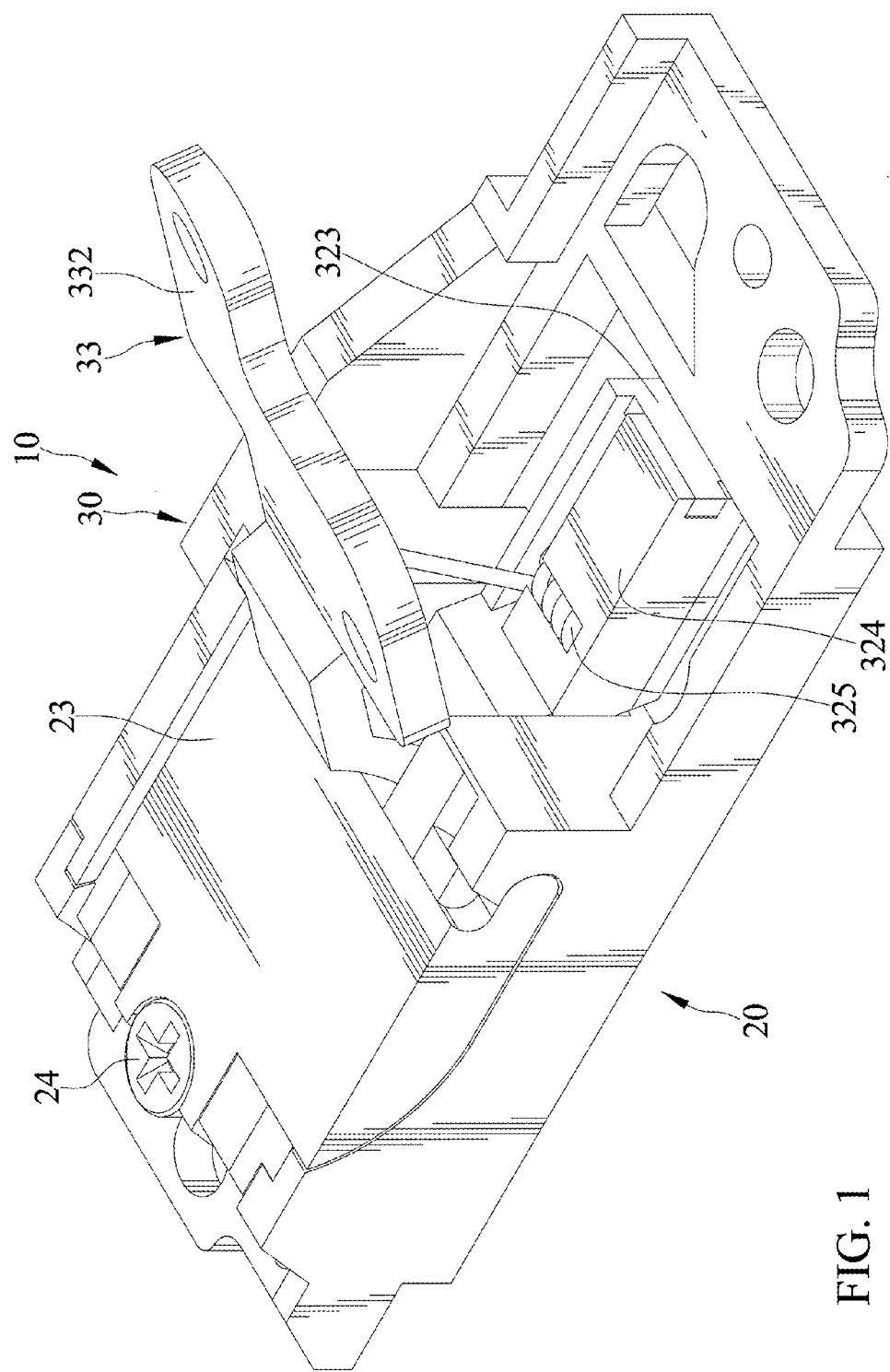
FIG. 1 is a perspective view of a pivotal device for a support of an electric device according to the present invention.
Figure 2:
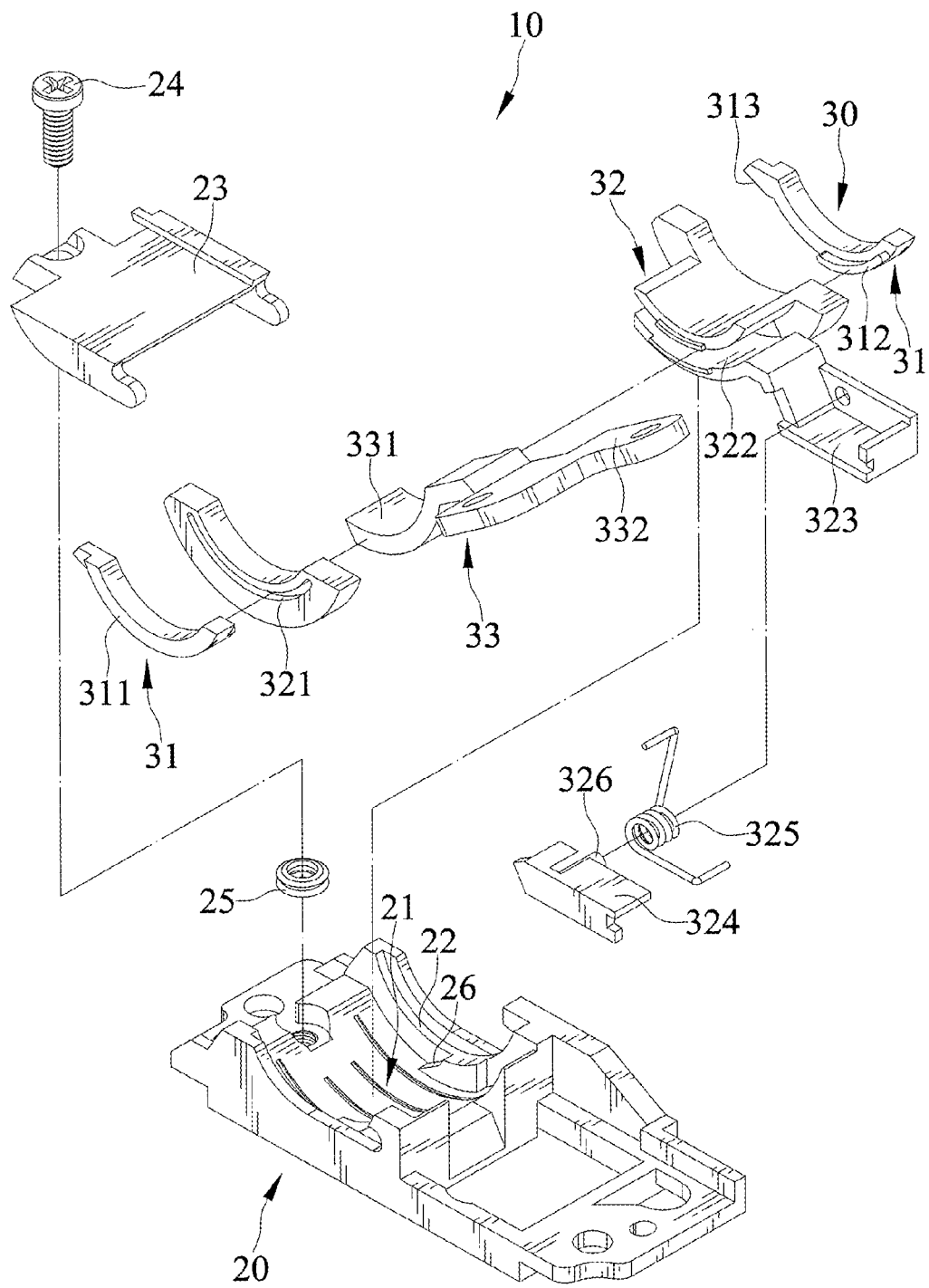
FIG. 2 is an exploded, perspective view of the pivotal device of FIG. 1.
Figure 3:
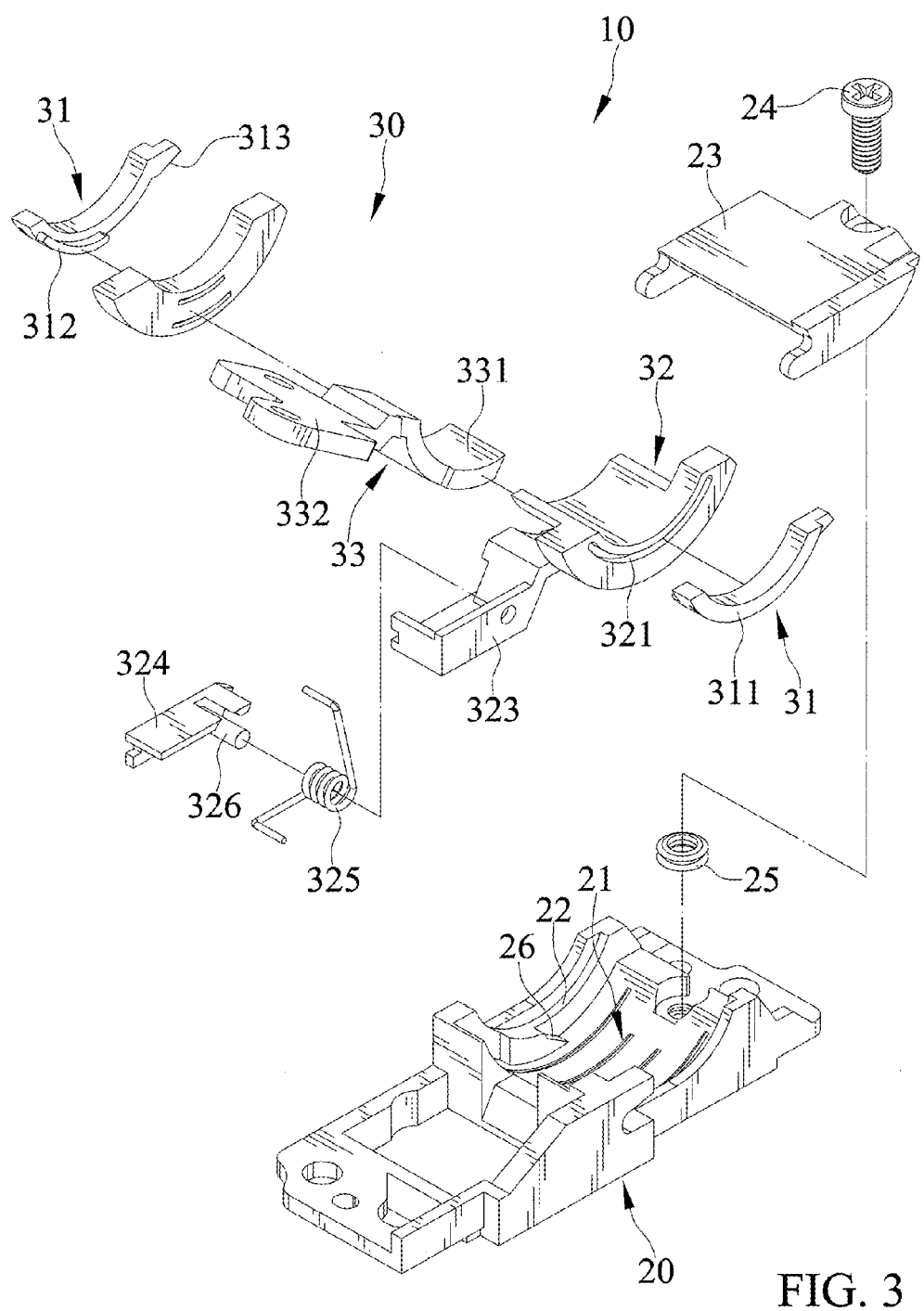
FIG. 3 is another exploded, perspective view of the pivotal device of FIG. 1.
Figure 4:
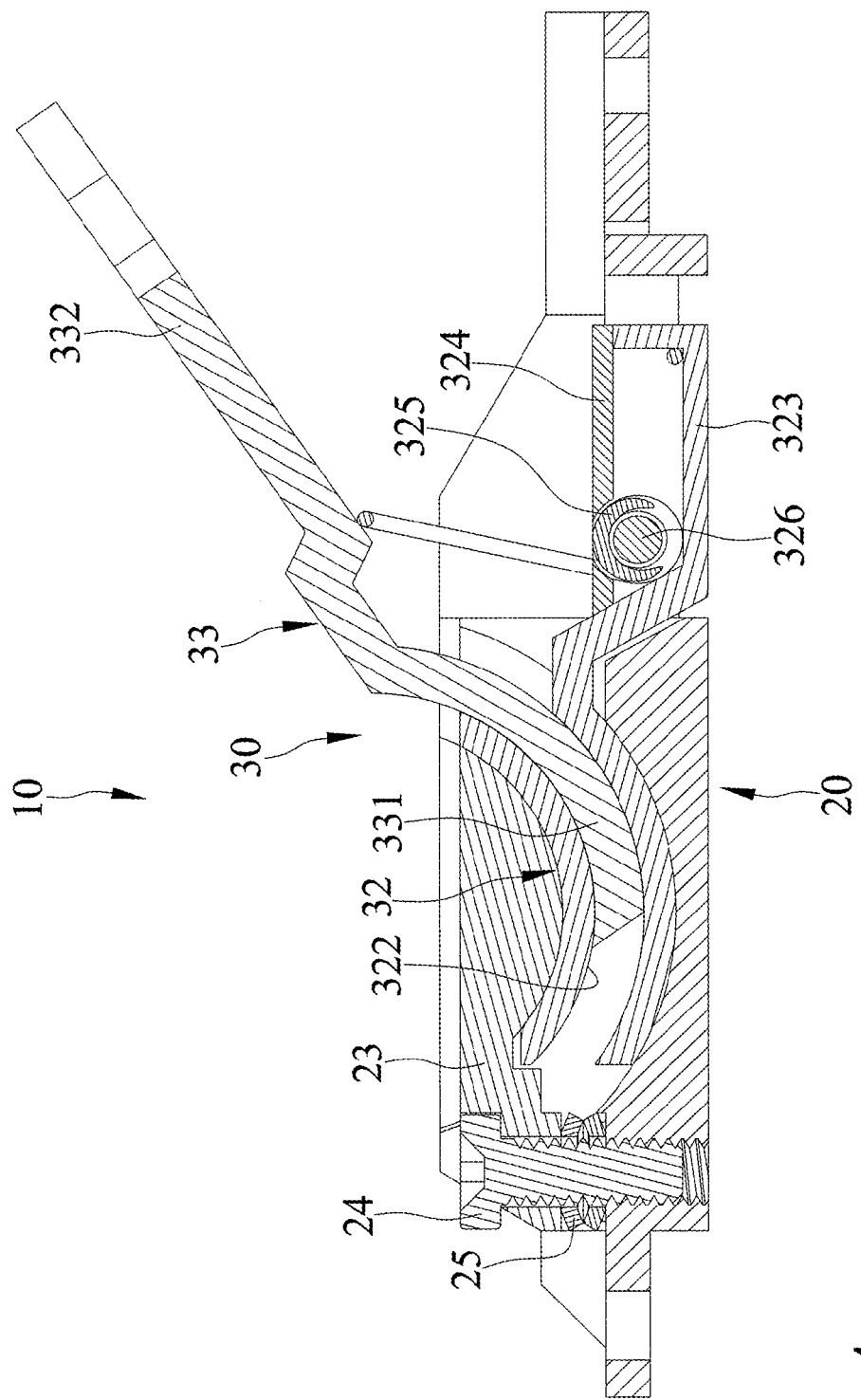
FIG. 4 is a cross sectional view of the pivotal device of FIG. 1.

With reference to FIGS. 1-4, a pivotal device 10 for a support of an electric device according to the present invention includes a base 20 and a flip module 30. The base 20 includes a compartment 21. At least one first track 22 is disposed in the compartment 21 and is arcuate. In this embodiment, the base 20 includes two first tracks 22 on opposite sides of the compartment 21.

A pressing member 23 is connected to the base 20 via an adjusting member 24. The adjusting member 24 is coupled to and movable relative to the base 20. The pressing member 23 and the adjusting member 24 are jointly movable toward to or away from the base 20. In this embodiment, the adjusting member 24 is connected to the base 20 by screwing. An elastic element 25 is mounted between the pressing member 23 and the base 20. The elastic element 25 includes a first end abutting the pressing member 23 and a second end abutting the base 20. The at least one first track 22 includes a limiting portion 26 on a side thereof adjacent to the compartment 21.

The flip module 30 is received in the compartment 21 and is movable relative to the base 20 along a contour of the at least one first track 22. The flip module 30 is located between the base 20 and the pressing member 23. The pressing member 23 abuts a side of the flip module 30 opposite to the base 20.

The flip module 30 includes at least one first sliding member 31, a second sliding member 32, and a third sliding member 33. The at least one first sliding member 31 is movable relative to the base 20 along a contour of the one of the two first tracks 22. In this embodiment, the flip module 30 includes two first sliding members 31 respectively aligned with the two first tracks 22.

Each of the two first sliding members 31 includes a first side having a first sliding lip 311 and a second side having a second sliding lip 312. The first sliding lip 311 of each of the two first sliding member 31 is disposed in one of the two first tracks 22. The first and second sliding lips 311 and 312 are arcuate. Each first sliding member 31 further includes a limiting protrusion 313. When the flip module 30 is extended, the limiting protrusion 313 abuts the limiting portion 26.

The pressing member 23 abuts the second sliding member 32. The second sliding member 32 includes two second tracks 321 respectively on two opposite sides thereof. A third track 322 is disposed between the two opposite sides of the second sliding member 32. The two second sliding lips 312 of the two first sliding members 31 are respectively and slideably received in the two second tracks 321. The two second tracks 321 and the third track 322 are arcuate. The second sliding member 32 further includes a carrier portion 323 adjacent to an end of the third track 322.

A supporting seat 324 is connected to the carrier portion 323 of the second sliding member 32. An elastic member 325 is mounted to the supporting seat 324. The supporting seat 324 includes a peg 326 on a side thereof adjacent to the carrier portion 323. The elastic member 325 has a first tang pressing against the carrier portion 323 of the second sliding member 32 and a second tang. The elastic member 325 further includes an intermediate portion between the first and second tangs and mounted around the peg 326.

The third sliding member 33 is coupled to the second sliding member 32 and is movable relative to the second sliding member 32 along a contour of the third track 322. The third sliding member 33 includes a first end having a sliding portion 331 and a second end having a connecting portion 332 opposite to the sliding portion 331. The sliding portion 331 of the third sliding member 33 is disposed in the third track 322. The connecting portion 332 extends beyond the compartment 21. The second tang of the elastic member 325 abuts the connecting portion 332 for pressing against the second sliding member 32. In this embodiment, the elastic member 325 is a torsion spring.

Figure 5:
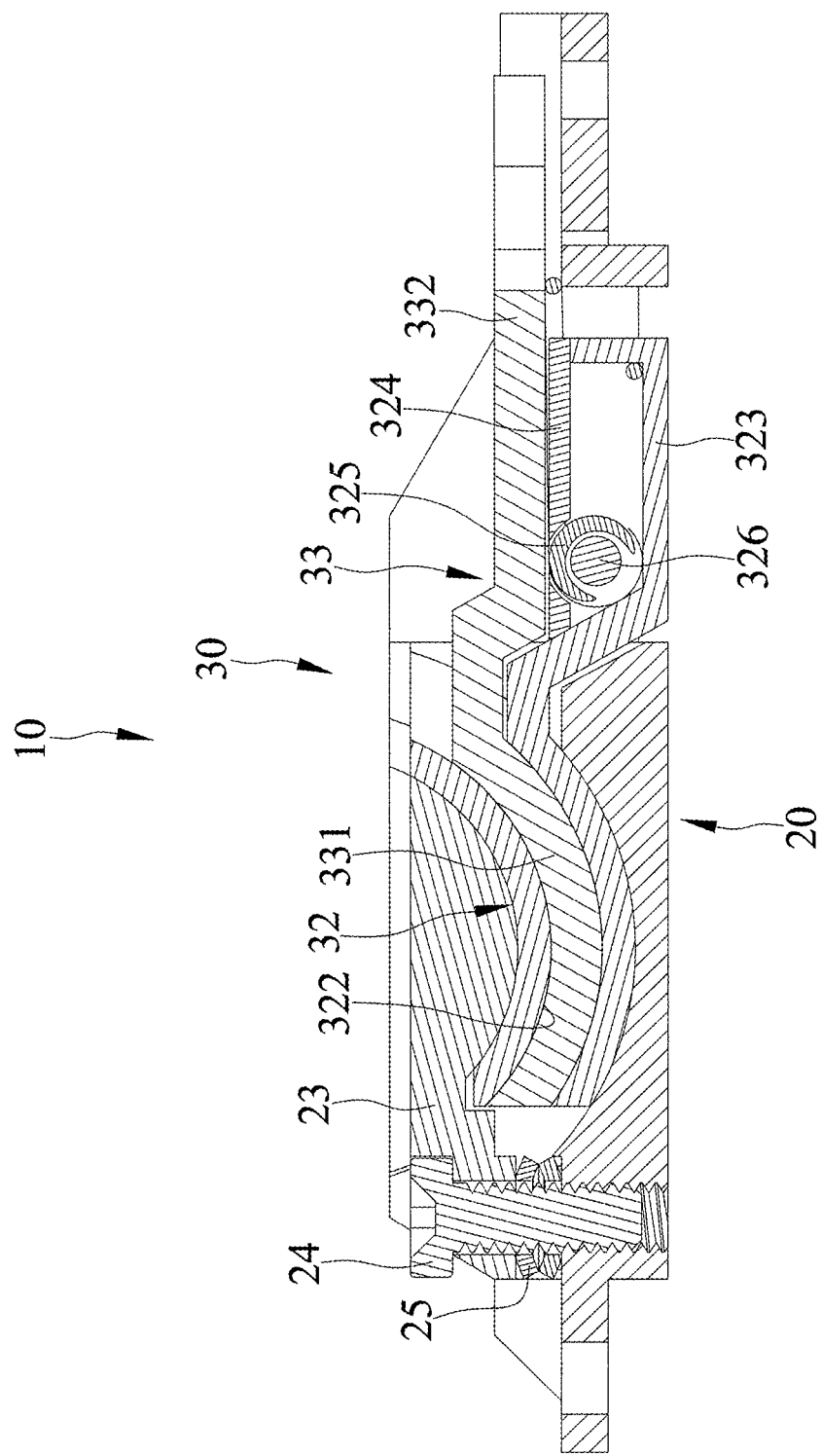
FIG. 5 is a view similar to FIG. 4, illustrating use of the pivotal device after the pivotal device is closed.
Figure 6:
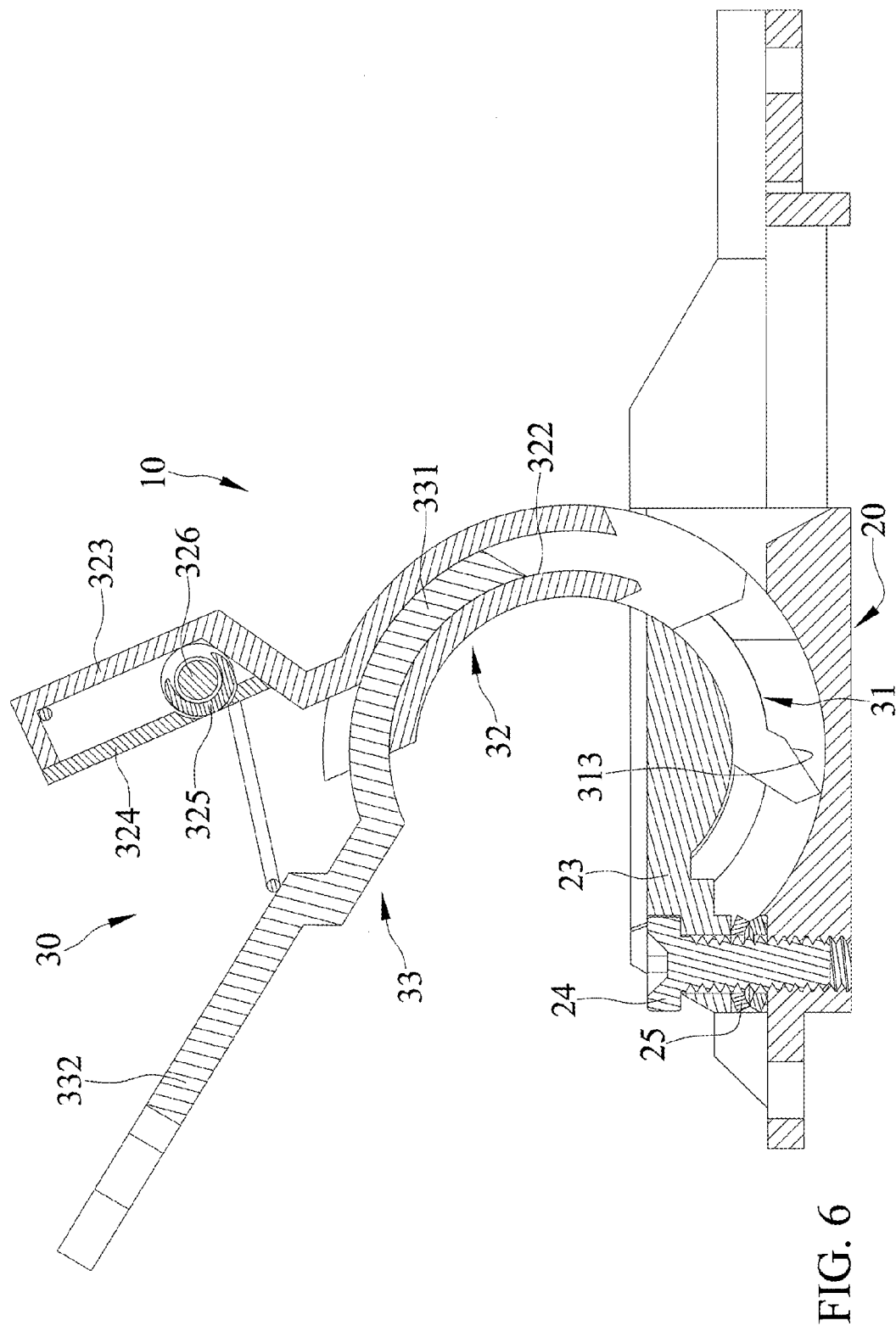
FIG. 6 is a view similar to FIG. 4, illustrating use of the pivotal device after the pivotal device is extended.

With reference to FIGS. 5 and 6, the base 20 can be connected to a body of an electronic device or a body of a support of an electronic device. The third sliding member 33 of the flip module 30 can be connected to a foot stand. When the pivotal device 10 is in an original position, the elastic member 325 presses against and, thus, moves the third sliding member 33, such that the flip module 30 automatically extends to a position at an angle of 35°-50° to the base 20 (see FIG. 4). The elastic member 325 does not move or sway and, thus, can provide a relatively stable elastic force in magnitude and direction.

A user can push the flip module 30 to decrease the angle between the flip module 30 and the base 20. The angular relationship between the flip module 30 and the base 20 can be fixed in the 0° position (see FIG. 5) by a fixing structure between the foot stand and the body of the support of the electronic device. Furthermore, the user can manually adjust the angle of the flip module 30 by pushing the third sliding member 33 to actuate the second sliding member 32 and the first sliding member 31 to move relative to the base 20. The maximum extended angle between the flip module 30 and the base 20 can be in a range between 145° and 165° (see FIG. 6). The contact area between the flip module 30 in the maximum extended angle position and the base 20 is still relatively large to assure the flip module 30 to be smoothly retrieved without getting stuck.

In view of the foregoing, the pivotal device 10 for a support of an electronic device according to the present invention includes a base 20 and a flip module 30. The base 20 includes a compartment 21. At least one first track 22 is disposed in the compartment 21 and is arcuate. A pressing member 23 is connected to the base 20 via an adjusting member 24. The adjusting member 24 is coupled to and movable relative to the base 20. The pressing member 23 and the adjusting member 24 are jointly movable toward to or away from the base 20. The flip module 30 is received in the compartment 21 and is movable relative to the base 20 along a contour of the at least one first track 22. The flip module 30 is located between the base 20 and the pressing member 23. The pressing member 23 abuts a side of the base 20 opposite to the flip module 30. By providing such a pivotal device 10, the resistant force during movement of the flip module 30 can be adjusted.

Although specific embodiments have been illustrated and described, numerous modifications and variations are still possible without departing from the scope of the invention. The scope of the invention is limited by the accompanying claims.

The invention claimed is:

1. A pivotal device for a support of an electric device, comprising:

a base including a compartment, with at least one first track disposed in the compartment and being arcuate, with a pressing member connected to the base via an adjusting member, with the adjusting member coupled to and movable relative to the base, and with the pressing member and the adjusting member jointly movable toward to or away from the base; and a flip module received in the compartment and movable relative to the base along a contour of the at least one first track, with the flip module located between the base and the pressing member, and with the pressing member abutting a side of the flip module opposite to the base;

the at least one first track including two first tracks respectively located on two opposite sides of the compartment, and with the flip module including two first sliding members respectively aligned with the two first tracks;

the flip module further including a second sliding member and a third sliding member, with each of the two first sliding members disposed in one of the two first tracks and movable relative to the base along a contour of the one of the two first tracks, with each of the two sliding members including a first side having a first sliding lip and a second side having a second sliding lip, with the first sliding lip of each of the two first sliding member disposed in one of the two first tracks, with the first and second sliding lips being arcuate, with the second sliding member including two second tracks respectively on two opposite sides thereof, with a third track disposed between the two opposite sides of the second sliding member, with the two second sliding lips of the two first sliding members respectively and slideably received in the two second tracks, with the two second tracks and the third track being arcuate, with the third sliding member coupled to the second sliding member and movable relative to the second sliding member along a contour of the third track, with the third sliding member including a first end having a sliding portion and a second end having a connecting portion opposite to the sliding portion, with the sliding portion of the third sliding member disposed in the third track, and with the connecting portion extending beyond the compartment.

2. The pivotal device for a support of an electric device as claimed in claim 1, with the second sliding member further including a carrier portion adjacent to an end of the third track, with a supporting seat connected to the carrier portion of the second sliding member, with an elastic member mounted to the supporting seat, with the supporting seat including a peg on a side thereof adjacent to the carrier portion, with the elastic member having a first tang pressing against the carrier portion of the second sliding member and a second tang abutting the stopper portion for pressing against the second sliding member, and with the elastic member further including an intermediate portion between the first and second tangs and mounted around the peg.

3. The pivotal device for a support of an electric device as claimed in claim 2, wherein the elastic member is a torsion spring.

4. The pivotal device for a support of an electric device as claimed in claim 2, wherein the adjusting member is connected to the base by screwing.

5. The pivotal device for a support of an electric device as claimed in claim 2, with the at least one track including a limiting portion on a side thereof adjacent to the compartment, with the first sliding member including a limiting protrusion, wherein when the flip module is extended, the limiting protrusion abuts the limiting portion.

6. The pivotal device for a support of an electric device as claimed in claim 2, further comprising an elastic element mounted between the pressing member and the base, with the elastic element including a first end abutting the pressing member and a second end abutting the base.

7. The pivotal device for a support of an electric device as claimed in claim 6, wherein the pressing member abuts the second sliding member.

* * * * *